June 28, 1932.  H. E. PARKER ET AL  1,864,610
ELECTRIC WELDING SYSTEM
Filed Aug. 27, 1929
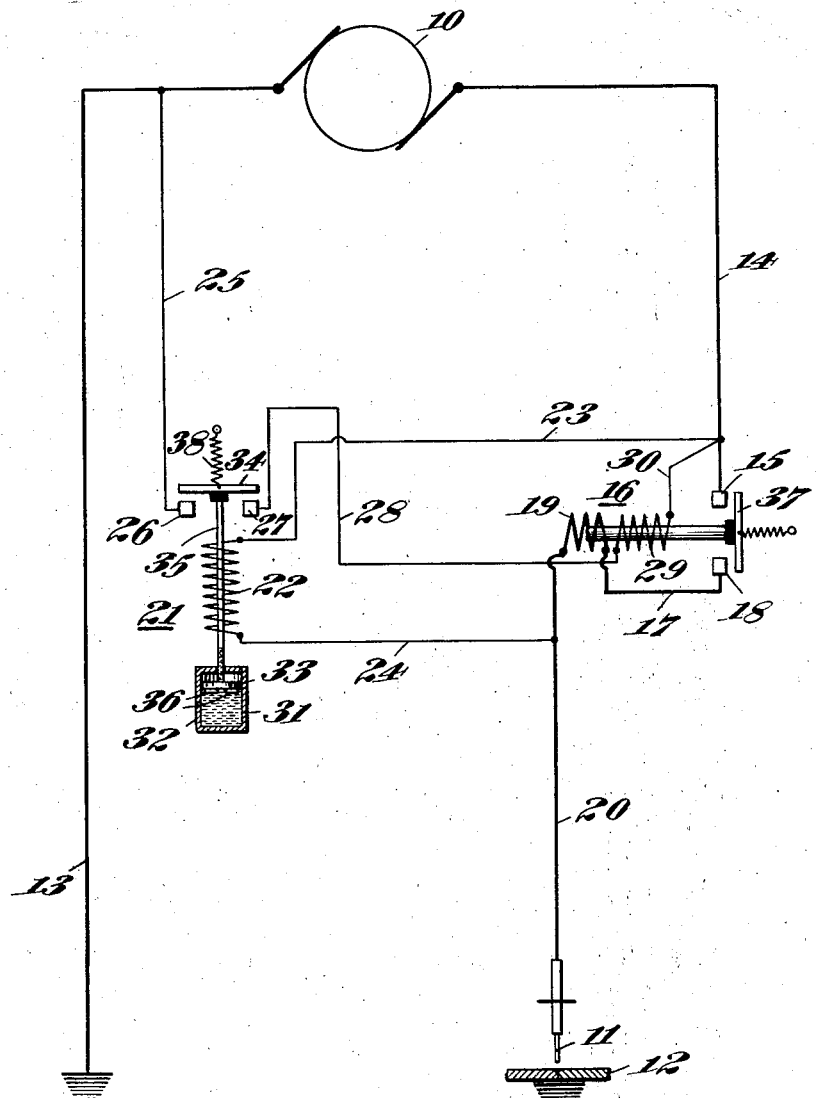
Inventors
H. E. Parker
and Simon Stewart.
By R. S. A. Dougherty
Attorney Patented June 28, 1932

1,864,610

UNITED STATES PATENT OFFICE

HARRY E. PARKER AND SIMON M. STEWART, OF QUINCY, MASSACHUSETTS, ASSIGNORS TO BETHLEHEM STEEL COMPANY, A CORPORATION OF PENNSYLVANIA

ELECTRIC WELDING SYSTEM

Application filed August 27, 1929. Serial No. 388,771.

Our invention relates to a safety device for use in connection with electric welding circuits and particularly for use in connection with electric arc welding.

In connection with electric arc welding the welding arc used is generally obtained by completing a welding circuit upon bringing a movable electrode into contact with a stationary electrode and subsequently separating them. The work may constitute one of the electrodes.

Heretofore welding circuits were so arranged that welding current was supplied to the electrode during the contacting of the electrode with the work and this would permit a dangerous flash to occur due to the high voltage which existed in the circuit.

It is therefore one of the objects of our invention to provide an auxiliary non-welding circuit having resistances therein which is adapted to be completed upon contacting the electrode with the work and which contains means for controlling the completion of the welding circuit.

Another object of our invention is to provide safety means in conection with the non-welding circuit which will retard the completion of the welding circuit sufficiently to permit the movable electrode being brought into contact with the work a predetermined period of time without causing a flash.

The novel features of our invention will be more fully understood from the following description and claims taken with the drawing, wherein we show diagrammatically a welding system connected to a source of power and embodying our safety device.

Referring to the drawing more in detail, 10 designates a generator for supplying current through suitable connections to the electrode 11 and the work 12, respectively. One side of the generator may be connected directly to the work through the wire 13 or where a welding machine is used the wire 13 may be grounded to the machine, as the work may be clamped to the machine. A wire 14 from the other side of the generator leads to the terminal 15 of the contactor switch 16. A wire 17 which is connected to the terminal 18 of the switch 16 leads to the holding coil 19. The coil 19 is provided for holding the switch 16 closed during the welding operation. A wire 20 connects the coil 19 with the electrode 11 and thus provides means for completing the welding circuit after the electrode has been contacted with the work and the switch 16 has been closed by means hereafter to be described.

If it were possible for the welding circuit to be completed directly upon bringing the electrode into contact with the work, a dangerous flash is liable to occur and to obviate this we have provided auxiliary circuits having resistances therein for preventing high-voltage current from passing therethrough and which are provided with our safety device which govern the operation of means for completing the welding circuit. One of these auxiliary circuits which is completed immediately upon contacting the electrode with the work may be termed a non-welding circuit as it is impossible to supply welding current therethrough due to the resistance therein.

This non-welding circuit operates our safety device which comprises an electromagnetically operated time relay switch 21, the electomagnetic coil 22 of which is connected to the wire 14 intermediate the generator 10 and the switch 16 by the wire 23, and to the wire 20 intermediate the coil 19 and the electrode 11 by the wire 24. The coil 22, when energized, is adapted to operate the core 35 and cause the contact bar 34 which is connected thereto to bridge the contacts 26 and 27, and is also adapted to act as a resistance to prevent high voltage current from being supplied through this circuit.

As the time elapsing between the contacting of the electrode 11 with the work to be welded and the supplying of welding current to the electrode and the work depends upon the time required for the relay switch 21 to bridge the contacts 26 and 27 through the medium of the contact bar 34, we preferably employ a dashpot 31 for the purpose of retarding the movement of the core 35 so as to delay the contact bar 34 connecting the contacts 26 and 27 the requisite interval of time, although any other well known timing device may be employed.

The dashpot 31 comprises a cylinder 32 which is attached to any suitable stationary member and a piston 33 which is operatively attached to the switch contact bar 34 through the medium of the core 35 of the coil 22. Suitable fluid is placed in the cylinder 32 so as to retard the movement of the piston 33 during the closing of the contacts 26 and 27. We preferably provide a spring 38 for returning the bar 34 to the position shown in the drawing. As it is desirable that the contacts 26 and 27 be disconnected quickly when the coil 22 becomes deenergized, it is essential that means be provided in the dashpot so that the fluid in the cylinder will be transferred rapidly from one side of the piston to the other side thereof during the movement of the piston to its normally idle position, as shown in the drawing, and for this purpose we have provided valves 36 in the piston 33 which are so arranged that they will open during this operation, but will close during the movement of the piston in the opposite direction so as to retard the transfer of the fluid during the movement of the contact bar 34 towards the contacts 26 and 27.

As soon as the contacts 26 and 27 have been connected current will be supplied from the generator to the coil 29 by means of the wires 14 and 30 and wires 25 and 28 thus completing an auxiliary circuit. The completion of this circuit will cause the coil 29 to become energized and will therefore cause its movable core or armature to be operated to bridge contacts 15 and 18 by means of the contact bar 37. The coil 29 also functions as a resistance unit to prevent high voltage current from passing through this circuit. As soon as the bar 37 bridges contacts 15 and 18 the welding circuit will be completed and welding current will be supplied through wires 14, 17, holding coil 19, wire 20, electrode 11 and wire 13 to the work 12, when this circuit is completed the holding coil 19 becomes energized and remains in this condition to hold the contactor switch 16 closed as long as the welding electrode is maintained in welding relation with the work, but will be deenergized as soon as the electrode is removed from such relation with the work.

When the operator desires to make a weld, the work having previously been connected to one side of the generator by means of the wire 13, he brings the movable electrode into contact with the work 12. This operation will cause a low voltage circuit to be completed, and non-welding current will be supplied to the work from the generator by means of the wires 14, 23, resistance coil 22, wires 24, 20 and electrode 11.

As soon as this circuit is completed the coil 22 becomes energized and attracts its core or armature 35 and causes the contact bar 34, which is connected thereto, to be moved towards the contacts 26 and 27. The movement of the bar 34, however, is retarded by the action of the dashpot 31, the piston of which is connected to the core 35. As soon as the contacts 26 and 27 are bridged by the bar 34, current will flow from the generator to the coil 29 by way of the wires 14 and 30 and 25 and 28 thus energizing the coil 29 which operates its core and causes the contact bar 37, which is connected thereto, to bridge the contacts 15 and 18. Welding current will now be supplied to the work through the wires 13, 14, 17, holding coil 19, wire 20 and the electrode 11. The proper welding arc can now be drawn and welding current will be supplied as long as the operator maintains the electrode in welding relation with the work, but as soon as this relation is severed the circuits will return to their original state.

It will therefore be understood from the above that it is impossible to supply a welding current to the work during the initial operation of bringing the electrode into contact with the work due to the resistance in the auxiliary circuits, and therefore the occurrence of a dangerous flash during such operation is eliminated. It will also be understood that the time the electrode may remain in contact with the work before a flash may occur depends upon the time required for the dashpot controlled relay 21 to move the contact bar 34 into engagement with the contacts 26 and 27. The dashpot 31 is therefore adjusted so that the desired interval of time will elapse between the contacting of the electrode with the work and the completion of the welding circuit.

It will therefore be obvious that we have devised a safety device for use in connection with electric welding which will insure the movable electrode coming into contact with the work to be welded a definite period without causing a flash.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

Having thus described our invention what we claim as new and desire to secure by Letters Patent is:

1. A welding system comprising a source of electrical supply, welding electrodes, connections from said source to said electrodes for initially supplying current to said electrodes upon the contacting thereof, an electromagnet, comprising a core and a coil, having its coil in series with one of said connections, said coil constituting a resistance in said connection to limit the supply of current therethrough, a shunt circuit for said coil constituting means for supplying welding current to the electrodes, a normally open switch in series with said shunt circuit, a shunt circuit for the source of supply, an electromagnet, comprising a core and a coil, having its coil in series with said circuit and having its core operatively connected to the switch in the first-mentioned shunt circuit, a normally open switch within the shunt circuit for the source of supply and operatively connected to the core of the first-mentioned electromagnet and a dashpot operatively connected to said switch.

2. An arc welding system comprising a source of electrical supply, welding electrodes, electrical connections from said source to said electrodes, an electromagnet having its coil in series with one of said connections and constituting a resistance in said connection to limit the supply of current to the electrode, a circuit shunting said coil for supplying welding current to said electrodes, a normally open switch within said circuit, a shunt circuit for the source of supply, an electromagnet coil in series with said circuit controlling the operation of the switch of the first-mentioned shunt circuit upon the energization thereof, a normally open switch within said circuit operatable to its closed position by the first-mentioned electromagnet for completing the shunt circuit for the source of supply, and means connected to said switch for retarding its movement to its closed position.

3. In an arc welding system, a source of electrical supply, an electrode, a main circuit for supplying welding current to the electrode, a normally open switch within said circuit, an auxiliary circuit constituting a shunt for said switch for initially supplying current to said electrode upon contacting said electrode with the work, current limiting means, comprising a resistance within said auxiliary circuit, a shunt circuit for the source of supply, a normally open switch and operating means for the switch of the main circuit within said shunt circuit, said means being rendered effective upon the closing of the switch in said shunt circuit, and means operated by the resistance element in the auxiliary circuit for closing the switch in said shunt circuit.

4. In an arc welding system, a source of electrical supply, an electrode, a main circuit for supplying welding current to the electrode, a normally open switch within said circuit, an auxiliary circuit constituting a shunt for said switch for initially supplying current to said electrode upon contacting said electrode with the work, current limiting means, comprising a resistance within said auxiliary circuit, a shunt circuit for the source of supply, a normally open switch and operating means for the switch of the main circuit within said shunt circuit, said means being rendered effective upon the closing of the switch in said shunt circuit, means operated by the resistance element in the auxiliary circuit for closing the switch in said shunt circuit, and means operatively connected to said switch to retard the closing thereof a predetermined period after the contacting of the electrodes.

5. In an arc welding system, a source of electrical supply, welding electrodes, electrical connections between said source and said electrodes for initially supplying current to the electrodes, an electromagnet, comprising a coil and a core, having its coil in series with one of said connections and constituting a resistance therein, a shunt circuit for said resistance for supplying welding current to said electrodes, a normally open electromagnetically operated switch within said shunt circuit for completing said circuit, a shunt circuit for the source of electrical supply connected to the electrical connections intermediate the electrodes and the source of power, an electromagnet comprising a coil in series with said shunt circuit for the source of supply and a core operatively connected to the switch of the first-mentioned shunt circuit, a normally open electromagnetically operated switch in the last-mentioned shunt circuit, means comprising the first-mentioned electromagnet when energized, for closing said switch, and a dashpot operatively connected to said switch for retarding the operation of said switch to its closed position.

6. An arc welding system comprising a source of electrical supply, welding electrodes, electrical connections from said source to said electrodes, an electromagnet comprising a coil and a core, having its coil in series with one of said connections and constituting a resistance therein, a shunt circuit for said resistance, a normally open magnetically operated switch within said shunt circuit, a shunt circuit for the source of supply, a normally open switch within said shunt circuit and operatively connected to the core of the electromagnet, a second electromagnet, comprising a coil in series with the shunt circuit for the source of supply and a core operatively connected to the switch of the first-mentioned shunt circuit, and means operatively connected to the switch within the shunt circuit for the source of supply for delaying the closing of said switch whereby upon contacting the electrodes current will be supplied initially through said resistance for a predetermined period and thereafter through the shunt circuit for said resistance.

7. A welding system comprising a source of electrical supply, a movable welding electrode electrically connected to said source and adapted to be brought into contact with work to be welded, an electromagnet, comprising a coil and a core, having its coil in series with the connection between said source of electrical supply and said electrode and constituting a resistance therein, a shunt circuit for the source of supply, a normally open switch within said shunt circuit and operatively connected to the core of the electromagnet, a second electromagnet, comprising a coil in series with the shunt circuit for the source of supply and a core operatively connected to the switch of the first-mentioned shunt circuit, and means operatively connected to the switch within the shunt circuit for the source of supply for delaying the closing of said switch, whereby upon contacting the electrode with the work current will be supplied initially through said resistance, thereby permitting the electrode to contact with the work a predetermined period without causing a flash.

In testimony whereof we hereunto affix our signatures.

HARRY E. PARKER.
SIMON M. STEWART.